United States Patent Office 3,360,344
Patented Dec. 26, 1967

3,360,344
EXTRACTION OF THE SULFURIC ACID COMPLEXES OF BERYLLIUM USING PRIMARY AMINES
Guy Bourat, Paris, France, assignor to Commissariat à l'Énergie Atomique, Paris, France
No Drawing. Filed Aug. 11, 1964, Ser. No. 388,930
Claims priority, application France, Aug. 30, 1963, 946,214
4 Claims. (Cl. 23—312)

The present invention relates to a process for liquid-liquid extraction of beryllium from sulphuric acid solutions of this metal.

It is known to extract beryllium from these sulphuric acid solutions in which it is present conjointly with aluminum by virtue of cation exchangers, especially di-(ethyl-2-hexyl)-phosphoric acid.

It is also known to extract organic anion species in an aqueous medium, in particular oxalic or salicyclic complexes by means of anion exchangers such as tri-n and tri-iso-octylamine.

However, the extraction of beryllium from its sulphuric acid solutions has never been carried out by means of anionic exchangers, this being probably due to the fact that the sulphuric acid complexes of beryllium are very little known.

The present applicants have just developed a process for the liquid-liquid extraction of beryllium from its aqueous sulphuric-acid solutions by means of anionic exchangers; amongst other advantages over the process of extraction by alkylphosphoric acid, the process according to the invention permits of a very high extraction speed, the equilibrium of species being reached very rapidly and further permits of easy re-extraction of beryllium in aqueous phase. These advantages confer an industrial character on the process according to the invention inasmuch as this latter permits the extraction and purification of beryllium from its aqueous sulphuric-acid solutions under very good yield conditions.

This process of liquid-liquid extraction of beryllium from its aqueous sulphuric-acid solutions essentially consists in extracting from a liquid organic phase which is immiscible with water the anionic sulphuric acid complexes of beryllium which are initially present in an aqueous phase by virtue of an intimate mixture of said phases followed by a decantation, the organic phase being constituted by one or a number of organic substances bearing a primary nitrogen in a carbon chain corresponding to the general formula:

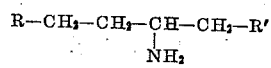

wherein R and R' are either hydrogen or any carbon radical, for example an alkyl radical, aryl radical or arylalkyl radical, the combination of both constituents R and R' being chosen so as to confer on the anionic exchanger a total molecular weight which is sufficient to ensure that its free basic form and its various salts are either insoluble or very little soluble in water, said organic substance or substances being in solution in an organic solvent which is immiscible with water, said aqueous phase being constituted by a sulphuric-acid solution of beryllium, the acidity of which is brought to a pH value which varies between 0 and 5.5 and preferentially between 1 and 5.

The said organic substances are in solution in an organic diluent which may be either aromatic or paraffinic and which is insoluble in water. It is of course an advantage to choose an inexpensive organic solvent such as kerosene. Their extraction capacity is approximately 0.2 gram-molecule of beryllium per gram-molecule of amine.

The process is particularly advantageous in that it permits a very high extraction speed, the equilibrium of complex species between phases being reached in less than 30 seconds, which represents a distinct improvement over the conventional method of extraction by means of an alkylphosphoric acid as stated above inasmuch as, in this latter case, this same equilibrium requires a contacting time of several tens of minutes in order to be reached under the same conditions.

This high speed of extraction of beryllium from its sulphuric-acid solutions makes the application of the process particularly valuable for purposes of industrial production.

The organic substances which correspond to the general formula:

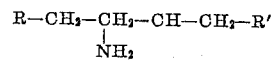

are suitable for the extraction of beryllium from its sulphuric acid solutions according to the process which is contemplated by the invention. It should be noted, however, that the nature of the radicals R and R' is not without influence on the solubility of the exchanger and of its salts in organic and/or aqueous phase, on the ease of decantation after mixing of the two phases, on the extraction selectivity with respect to anionic species which are foreign to beryllium and which may be present, and on the coefficient of division of the beryllium itself as a result of steric hindrance due to possible branchings of R and R'. The radicals R and R' will preferably although not exclusively be alkyl radicals, aryl radicals or arylalkyl radicals.

It should be noted that, if ferric salts are present conjointly with beryllium in its sulphuric-acid solutions, these ferric salts must be reduced to the ferrous state in order to favor the beryllium yield by making use of liquid anionic exchangers according to the invention.

The recovery of beryllium from the organic phase can be carried out by any known means in the techniques which entail the use of anionic exchangers, such as, for example, direct precipitation in organic phase by means of an alkaline agent or re-extraction in aqueous phase by means of a solution of chlorides, sulphates, nitrates employed either alone or in mixtures which are brought to a suitable pH value in order to prevent precipitation of the beryllium.

A few examples of application of the process according to the invention will now be described without any limitation being implied.

*Example 1*

A 0.3 M solution of 3,9-diethyl-6-aminotridecane in kerosene is subjected to powerful stirring for a period of one minute with its volume of an aqueous sulphuric-acid solution of beryllium having a pH value of 1 and containing 1 g./l. Be. After decantation, 0.42 g./l. of beryllium is found in the organic phase.

*Example 2*

A 0.3 M solution of 3,9-diethyl-6-aminotridecane in the form of bisulphate in kerosene is powerfully agitated for a period of one minute with its volume of an aqueous solution of beryllium having a pH value of 5 and containing 1 g./l. Be. After decantation, 0.44 g./l. of beryllium is found in the organic phase.

*Example 3*

Under the conditions of operation of Example 1, if benzene is employed instead of kerosene, 0.35 g./l. of beryllium is found after extraction in the organic phase.

Example 4

Under the same conditions as Example 1, if 12-aminotridecane is employed instead of 3,9-diethyl-6-aminotridecane, then all other things being equal, 0.3 g./l. Be is found in the organic phase after extraction.

Example 5

Under the conditions of Example 1, if a primary amine marketed under the trade name "Primere 81 R" or 1,4-epoxy-6,8-cyclotrimethylene-10-ethyl-7-aminotetradecane or a secondary amine or a tertiary amine is employed instead of 3,9-diethyl-6-aminotridecane, then, all other things being equal, no beryllium is found in the organic phase after extraction.

Example 6

A 0.3 M solution of 3,9-diethyl-6-aminotridecane in kerosene is powerfully agitated for a period of one minute with its volume of an aqueous solution of sulphuric acid having a pH value of 1 and containing 1 g./l. Be and 5 g./l. of ferric salt.

After decantation, there is found in organic phase 4 g./l. of iron and no beryllium.

Example 7

Under the conditions of Example 6, if ferrous iron is employed instead of ferric iron, then, all other things being equal, there is found after extraction 0.4 g./l. of beryllium and traces of iron.

Example 8

Under the conditions of Example 6, if aluminum is employed instead of ferric iron, then, all other things being equal, 0.4 g./l. of beryllium and 0.1 g./l. of aluminum are found in the organic phase after extraction.

According to the foregoing examples, it can be seen that better results are obtained by employing 3,9-diethyl-6-aminotridecane in the form of bisulphate.

Example 5 shows that only those organic substances which satisfy the conditions referred to earlier are suitable for the purpose; if the carbon atom which is directly linked with the nitrogen is trisubstituted, this is the case of "Primere 81 R"; if the two successive carbon atoms linked on each side with the functional carbon atom which carries the primary nitrogen atom are not secondary, this is the case of 1,4-epoxy-6,8-cyclotrimethylene-10-ethyl-7-aminotetradecane; finally, if the amine is either secondary or tertiary, the extraction capacity of these substances with respect to beryllium becomes zero.

Example 7 confirms the need to reduce the ferric salts to ferrous salts which can be present conjointly with beryllium in sulphuric-acid solutions of this metal prior to applying the process according to the invention. Example 8 clearly shows that, in spite of this stage of reduction of ferric salts, the organic substance will retain with respect to beryllium the same extraction capacity as if the sulphuric-acid solution to be treated had originally been free of ferric salts. The presence of aluminum in the sulphuric acid solution of beryllium does not impair the extraction efficiency of the organic substance, as is shown in Example 8.

What I claim is:

1. Process for liquid-liquid extraction of beryllium from its aqueous sulphuric-acid solutions, said process comprising intimately contacting an aqueous solution containing sulfuric-acid anionic complexes of beryllium with a water inmiscible liquid organic phase containing at least one organic compound selected from the group consisting of compounds carrying a primary nitrogen and a carbon chain corresponding to the general formula:

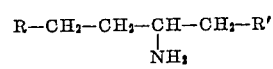

$$R-CH_2-CH_2-CH-CH_2-R'$$
$$|$$
$$NH_2$$

wherein R and R' are either hydrogen or a hydrocarbon group, the combination of the two constituents R and R' being chosen so as to confer on the anionic exchanger a total molecular weight which is sufficient to ensure that its free basic form and its various salts are either insoluble or very little soluble in water, said organic compound being in solution in an organic solvent which is immiscible with water, adjusting the pH of the aqueous phase prior to contact to a pH of between 1 and 5, allowing the mixed phases to separate, decanting off the organic phase containing the extracted sulfuric-acid anionic complexes of beryllium, and recovering the extracted beryllium from the organic phase.

2. Process in accordance with claim 1, wherein the substituents R and R' of said organic compounds are alkyl groups, aryl groups or arylalkyl groups.

3. Process in accordance with claim 1, wherein said process entails a preliminary stage of reduction of ferric salts in the case in which said salts are present conjointly with beryllium in its sulphuric-acid solutions.

4. Process in accordance with claim 1 wherein the organic compound is 3,9-diethyl-6-aminotridecane.

References Cited

UNITED STATES PATENTS

| | | | |
|---|---|---|---|
| 2,877,250 | 3/1959 | Brown | 23—340 |
| 3,116,110 | 12/1963 | Morana | 23—117 X |
| 3,131,994 | 5/1964 | Surls | 23—312 X |
| 3,148,022 | 9/1964 | Kruse | 23—117 X |
| 3,208,816 | 9/1965 | Vondra | 23—312 X |

OTHER REFERENCES

Coleman et al.: Ind. and Engin. Chem., vol. 50, #12, December 1958, pp. 1756 to 1762.

NORMAN YUDKOFF, *Primary Examiner.*

S. J. EMERY, *Assistant Examiner.*